(12) United States Patent
Qiao et al.

(10) Patent No.: US 11,004,585 B2
(45) Date of Patent: May 11, 2021

(54) PERMANENT MAGNET, ROTOR, MOTOR, AND COMPRESSOR

(71) Applicant: GUANGDONG MEIZHI COMPRESSOR CO., LTD., Foshan (CN)

(72) Inventors: Zhengzhong Qiao, Foshan (CN); Linshu Mao, Foshan (CN); Minghu Yu, Foshan (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 236 days.

(21) Appl. No.: 16/200,216

(22) Filed: Nov. 26, 2018

(65) Prior Publication Data

US 2019/0123605 A1 Apr. 25, 2019

Related U.S. Application Data

(63) Continuation of application No. PCT/CN2016/108736, filed on Dec. 6, 2016.

(30) Foreign Application Priority Data

May 27, 2016 (CN) .......................... 20160370640.0
May 27, 2016 (CN) ........................ 201620508171.X

(51) Int. Cl.
| | |
|---|---|
| H01F 7/02 | (2006.01) |
| H02K 1/27 | (2006.01) |
| F04B 17/03 | (2006.01) |
| H02K 1/14 | (2006.01) |

(52) U.S. Cl.
CPC ........... *H01F 7/021* (2013.01); *H01F 7/0242* (2013.01); *H02K 1/274* (2013.01); *H02K 1/276* (2013.01); *F04B 17/03* (2013.01); *H02K 1/14* (2013.01); *H02K 2213/03* (2013.01)

(58) Field of Classification Search
CPC .... H02K 1/274; H02K 1/276; H02K 2213/03; H02K 1/14; H02K 1/27; H01F 7/021; H01F 7/0242; H01F 41/0253; F04B 17/03; F04B 35/04
See application file for complete search history.

(56) References Cited

FOREIGN PATENT DOCUMENTS

| | | |
|---|---|---|
| CN | 101572470 A | 11/2009 |
| CN | 202111536 U | 1/2012 |
| CN | 202435148 U | 9/2012 |

(Continued)

OTHER PUBLICATIONS

Extended European Search Report dated Apr. 2, 2019 received in European Patent Application No. EP 16902984.0.

(Continued)

*Primary Examiner* — Mohamad A Musleh
(74) *Attorney, Agent, or Firm* — Scully Scott Murphy & Presser

(57) ABSTRACT

A permanent magnet, a rotor, a motor and a compressor are provided. A work face of the permanent magnet includes a first edge and a second edge, a head endpoint of the first edge is connected to a tail endpoint of the second edge by means of a transition edge, the transition edge is located at a side, adjacent to a center of the work face, of a line connecting the head endpoint with the tail endpoint, and the transition edge includes at least one sub-arc segment, or a combination of at least one sub-arc segment and at least one sub-straight segment.

11 Claims, 11 Drawing Sheets

(56) References Cited

FOREIGN PATENT DOCUMENTS

| | | |
|---|---|---|
| CN | 105515225 A | 4/2016 |
| CN | 105743233 A | 7/2016 |
| CN | 105896755 A | 8/2016 |
| CN | 205647046 U | 10/2016 |
| CN | 205791821 U | 12/2016 |
| JP | 2001-248556 A | 9/2001 |
| JP | 2003-037965 A | 2/2003 |
| JP | 2004-96955 A | 3/2004 |
| JP | 2004-096955 A | 3/2004 |
| WO | 2015/029387 A1 | 3/2015 |

OTHER PUBLICATIONS

International Search Report and Written Opinion dated Mar. 1, 2017 received in PCT International Application No. PCT/CN2016/108736.
First Office Action dated Jan. 19, 2018 received in Chinese Patent Application No. 201610370640.0, together with English language translation.
Notice of Reasons for Refusal dated Nov. 26, 2019 received in Japanese Patent Application No. 2018-562190, together with English language translation.
Notification of Reason for Refusal dated Jan. 7, 2020 received in Korean Patent Application No. 10-2018-7037607 together with English language translation.
Notice of Reasons for Refusal dated May 26, 2020 received in Japanese Patent Application No. JP 2018-562190 together with an English language translation.

PERMANENT MAGNET, ROTOR, MOTOR, AND COMPRESSOR

CROSS REFERENCE TO RELATED APPLICATIONS

This application is a continuation application of PCT Patent Application No. PCT/CN2016/108736, entitled "PERMANENT MAGNET, ROTOR, MOTOR, AND COMPRESSOR" filed on Dec. 6, 2016, which claims priority to Chinese Patent Application No. 201610370640.0, entitled "PERMANENT MAGNET, ROTOR, MOTOR, AND COMPRESSOR" filed with the Chinese Patent Office on May 27, 2016 and Chinese Patent Application No. 201620508171.X, entitled "PERMANENT MAGNET, ROTOR, MOTOR, AND COMPRESSOR", filed with the Chinese Patent Office on May 27, 2016, all of which are incorporated herein by reference in their entirety.

FIELD

The present disclosure relates to the technical field of refrigeration equipment, and more particularly to a permanent magnet, a rotor, a motor, and a compressor.

BACKGROUND

A rare earth embedded permanent magnet generally has a square work face, i.e. a long edge and a short edge of the work face directly intersect. The coefficient of flux utilization is low and the cost of the permanent magnet is high due to the structure. The cost performance of a permanent magnet motor is low.

In the related art, the work face of the permanent magnet is made into an irregular shape in order to reduce the cost of the permanent magnet and raising the coefficient of flux utilization. However, inappropriate arrangement of the irregular shape results poor mechanical strength character of the permanent magnet and poor manufacturability.

SUMMARY

The present disclosure seeks to solve at least one of the problems existing in the related art. Therefore, according to a first aspect of the present disclosure, a permanent magnet is hereby provided, and the permanent magnet is high in cost performance and good in manufacturability.

According to a second aspect of the present disclosure, another permanent magnet is provided.

According to a third aspect of the present disclosure, a rotor with the above permanent magnet is provided.

According to a fourth aspect of the present disclosure, a motor with the above rotor is provided.

According to a fifth aspect of the present disclosure, a compressor with the above motor is provided.

As for the permanent magnet according to the first aspect of the present disclosure, a work face of the permanent magnet includes a first edge and a second edge which are perpendicular to each other, a head endpoint of the first edge is connected to a tail endpoint of the second edge by means of a transition edge, the transition edge is located at a side, adjacent to a center of the work face, of a line connecting the head endpoint with the tail endpoint, and the transition edge includes at least one sub-arc segment, or a combination of at least one sub-arc segment and at least one sub-straight segment.

With the permanent magnet according to the present disclosure, the material cost can be saved, the mechanical strength can be enhanced, and the manufacture qualification rate can be raised by defining the shape of the transition edge.

According to an embodiment, an extension line, extending from the head endpoint, of the first edge intersects an extension line, extending from the tail endpoint, of the second edge at a point of intersection, and the permanent magnet satisfies $$WL/\sqrt{W^2+L^2} \leq Dx \leq 0.9\sqrt{W^2+L^2},$$

in which W denotes a distance between the point of intersection and the head endpoint, L denotes a distance between the point of intersection and the tail endpoint, Dx denotes a distance between the point of intersection and a midpoint of any sub-arc segment.

According to an embodiment, the permanent magnet further satisfies $$WL/\sqrt{W^2+L^2} \leq Dx \leq 0.8\sqrt{W^2+L^2}.$$

According to an embodiment, a length S of the transition edge satisfies $$S<0.95(W+L).$$

According to an embodiment, a curvature p of the sub-arc segment satisfies $$\rho < 0.7 \text{ mm}^{-1}.$$

According to an embodiment, the head endpoint and/or the tail endpoint are directly connected to the sub-arc segment or the sub-straight segment.

According to an embodiment, when the head endpoint is directly connected to the sub-arc segment, an included angle $\alpha 1$ between the sub-arc segment which is directly connected to the head endpoint and the first edge satisfies $\alpha 1 \geq 90°$; and/or when the tail endpoint is directly connected to the sub-arc segment, an included angle $\alpha 2$ between the sub-arc segment which is directly connected to the tail endpoint and the second edge satisfies $\alpha 2 \geq 90°$; and/or when the head endpoint is directly connected to the sub-straight segment, an included angle $\beta 1$ between the sub-straight segment which is directly connected to the head endpoint and the first edge satisfies $\beta 1 \geq 90°$; and/or when the tail endpoint is directly connected to the sub-straight segment, an included angle $\beta 2$ between the sub-straight segment which is directly connected to the tail endpoint and the second edge satisfies $\beta 2 \geq 90°$.

According to an embodiment, the transition edge is directly connected to the head endpoint and the tail endpoint by means of the sub-arc segment or the sub-straight segment respectively, an included angle $\alpha$ between the transition edge and the first edge and an included angle $\beta$ between the transition edge and the second edge satisfy $\alpha + \beta \geq 270°$.

As for the permanent magnet according to the second aspect of the present disclosure, a work face of the permanent magnet is a substantially rectangle formed by four edges which are connected from a head to a tail sequentially, and a head endpoint and a tail endpoint of at least one group of adjacent edges are connected by means of a transition edge; the transition edge is located at a side, adjacent to a center of the work face, of a line connecting the head endpoint with the tail endpoint, and includes at least one sub-arc segment or a combination of at least one sub-arc segment and at least one sub-straight segment; included angles between the transition edge and the group of adjacent edges which are connected to the transition edge are each larger than or equal to 90°, a sum of the included angles between the transition edge and the group of adjacent edges which are connected to the transition edge is less than or equal to 270°, and the permanent magnet satisfies $$WL/\sqrt{W^2+L^2} \le Dx \le 0.9\sqrt{W^2+L^2},$$

in which extension lines of the group of adjacent edges intersect at a point near the transition edge, W denotes a distance between the point and the head endpoint, L denotes a distance between the point and the tail endpoint, and Dx denotes a distance between the point and a midpoint of any sub-arc segment.

With the permanent magnet according to the present disclosure, the coefficient of flux utilization can be raised, the performance of a motor can be ensured, meanwhile, the manufacture qualification rate can be raised, and the manufacturability and mechanical strength are good.

The rotor according to the third aspect of the present disclosure includes the permanent magnet according to the first aspect or the second aspect.

The rotor according to the present disclosure is provided with the permanent magnet of the first or second aspect, thereby improving the whole performance of the rotor. The motor according to the fourth aspect of the present disclosure includes the rotor according to the third aspect.

The motor according to the present disclosure is provided with the rotor of the third aspect, and the motor is good in performance and low in cost, achieving good cost performance and good manufacturability.

The compressor according to the fifth aspect of the present disclosure includes the motor according to the fourth aspect.

The compressor according to the present disclosure is provided with the motor of the first aspect, thereby reducing a manufacturing cost of the compressor, improving the performance of the compressor, and achieving good cost performance in whole.

Additional aspects and advantages of embodiments of present disclosure will be given in part in the following descriptions, become apparent in part from the following descriptions, or be learned from the practice of the embodiments of the present disclosure.

REFERENCE NUMERALS

Figure 1:
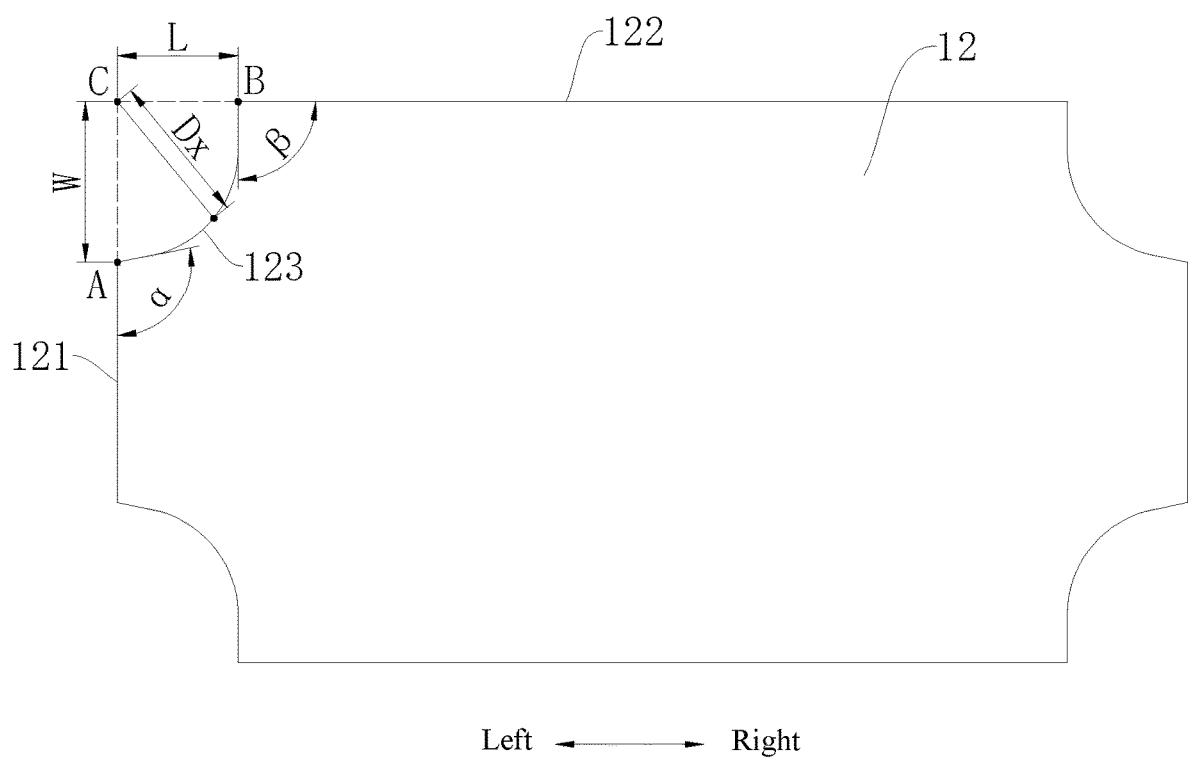
FIG. 1 is a schematic view of a permanent magnet according to an embodiment of the present disclosure.

Compressor 100,
motor 10,
stator 2, stator core 21, winding 22,
rotor 1, rotor core 11, permanent magnetic groove 111,
permanent magnetic 12,
first edge 121, second edge 122,
transition edge 123, sub-arc segment 123a, sub-straight segment 123b,
crank 20, main bearing 30, cylinder 40, piston 50, supplementary bearing 60.

DETAILED DESCRIPTION

Reference will be made in detail to embodiments of the present disclosure. The same or similar elements and the elements having same or similar functions are denoted by same reference numerals throughout the descriptions. The embodiments described herein with reference to drawings are explanatory, illustrative, and used to generally understand the present disclosure. The embodiments shall not be construed to limit the present disclosure.

Various different embodiments or examples are provided below to realize different structures of the present disclosure. Components and arrangements of special examples are described below for simplifying the present disclosure. Of course, they are examples rather than limit the present disclosure. In addition, reference numerals and/or letters may repeat in different examples of the present disclosure, such repetition is used for simplification and clearness and does not indicate relationship between various embodiments and/or arrangements. Furthermore, the present disclosure provides various examples of specific technics and materials, however applicability of other technics and/or uses of other materials can be understood by those skilled in the art.

A permanent magnet 12 according to embodiments of the first aspect of the present disclosure is described with reference to FIG. 1 to FIG. 18.

FIG. 1 illustrates the permanent magnet 12 according to embodiments of the first aspect of the present disclosure. The permanent magnet 12 has a work face, the work face includes a first edge 121 and a second edge 122 which are perpendicular to each other. A head endpoint A of the first edge 121 is connected to a tail endpoint B of the second edge 122 by means of a transition edge 123. The transition edge 123 is located at a side (such as a right side of a line connecting A with B shown in FIG. 1), adjacent to a center of the work face, of a line connecting the head endpoint A with the tail endpoint B. The transition edge 123 includes at least one sub-arc segment 123a, or a combination of at least one sub-arc segment 123a and at least one sub-straight segment 123b. That is, the transition edge 123 may include only the sub-arc segment 123a, and the transition edge 123 may include the combination of the sub-arc segment 123a and the sub-straight segment 123b. Therefore, a cost of material can be saved, and a mechanical strength of a structure of the permanent magnet 12 is enhanced, obtaining good manufacturability of the permanent magnet 12.

In the above two different embodiments (the transition edge 123 includes the at least one sub-arc segment 123a; the transition edge 123 includes the at least one sub-arc segment 123a, or the combination of the at least one sub-arc segment 123a and the at least one sub-straight segment 123b), the transition edge 123 herein includes the "sub-arc segment 123a", and the "sub-arc segment 123a" below further restricts at least one of the two embodiments. That is, the "sub-arc segment 123a" below further restricts the former embodiment (the transition edge 123 only includes the sub-arc segment 123a), also can further restrict the latter embodiment (the transition edge 123 includes the sub-arc segment 123a and the sub-straight segment 123b).

With the permanent magnet 12 according to embodiments of the present disclosure, the material cost can be saved, the mechanical strength can be enhanced, and the manufacture qualification rate can be raised by defining the shape of the transition edge 123.

In an embodiment of the present disclosure, referring to FIG. 1, an extension line, extending from the head endpoint A, of the first edge 121 intersects an extension line, extending from the tail endpoint B, of the second edge 122 at a point C of intersection, and the permanent magnet 12 can satisfy $$WL/\sqrt{W^2+L^2} \leq Dx \leq 0.9\sqrt{W^2+L^2}.$$

W denotes a distance between the point C of intersection and the head endpoint A. L denotes a distance between the point C of intersection and the tail endpoint B. Dx denotes a distance between the point C of intersection and a midpoint of any sub-arc segment 123a. Therefore, the coefficient of flux utilization of the permanent magnet 12 can be raised, the performance of a motor 10 can be ensured, meanwhile, the mechanical strength of the permanent magnet 12 can be further improved, achieving good manufacturability of the permanent magnet 12.

Optionally, with reference to FIG. 1, the permanent magnet 12 can further satisfy $WL/\sqrt{W^2+L^2} \leq Dx \leq 0.9\sqrt{W^2+L^2}$. Therefore, on the premise that the performance of the motor 10 is not influenced, the mechanical strength of the permanent magnet 12 can be further enhanced and the manufacture rejection rate of the permanent magnet 12 can be reduced.

It should be noted that herein, during manufacture of the permanent magnet 12, rare earth powders are compressed by a compression mold. Portions which have small dimension cannot be compressed uniformly if the portions have too small dimension. Meanwhile, molded rare earth at the portions which have small dimension will be moved when the compression mold is taken from compressed rare earth, which influence quality of a rare earth workblank, resulting in large rejection rate of permanent magnet 12. The above problems existing in manufacture can be effectively solved when the sub-arc segment 123a has a small curvature.

In some embodiments of the present disclosure, with reference to FIG. 1 to FIG. 14, a length S of the transition edge 123 can satisfy S<0.95(W+L). The mechanical strength of the permanent magnet 12 can be further ensured herein, and the manufacturability of the permanent magnet 12 can also be further improved, and the rejection rate of the permanent magnet 12 can be reduced.

Figure 13:
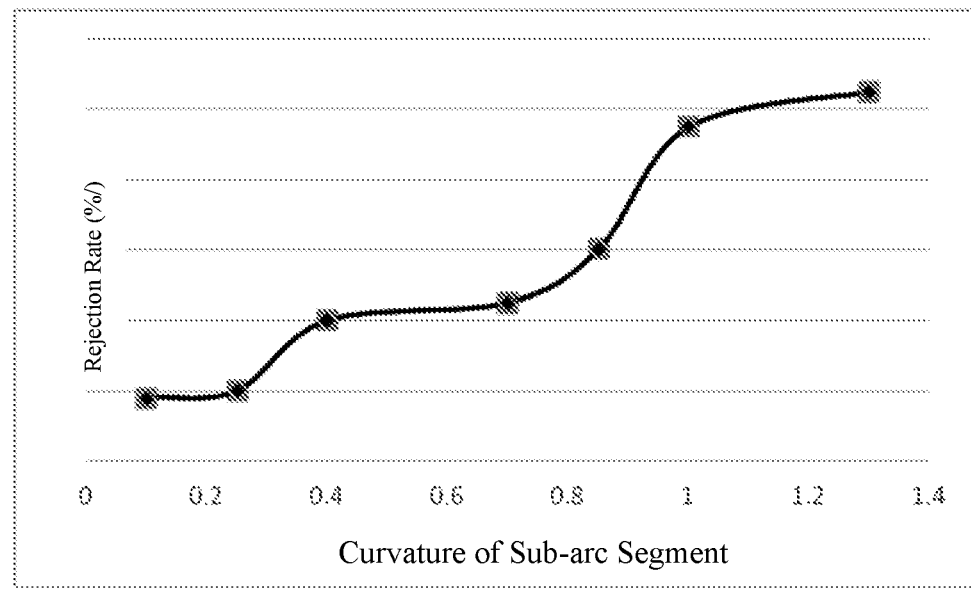
FIG. 13 is a schematic view of a manufacture qualification rate of a permanent magnet according to an embodiment of the present disclosure, in which, the manufacture qualification rate varies with $\alpha$ and $\beta$.

In some embodiments, referring to FIG. 13, a curvature p of the sub-arc segment 123a satisfies $\rho < 0.7$ mm$^{-1}$. The mechanical strength of the permanent magnet 12 can be further ensured herein, and the manufacturability of the permanent magnet 12 can also be further improved, and the rejection rate of the permanent magnet 12 can be reduced.

It should be noted that herein, a drop test will be carried out on the permanent magnet 12 as a conventional evaluation experiment. The strength of the permanent magnet 12 becomes poor if the sub-arc segment 123a has an overlarge curvature or a total length of the sub-straight segment 123b and the sub-arc segment 123a is too long, which results failure in drop test. The permanent magnet 12 easily breaks down during operation of the motor, thereby influencing reliability of the motor 10.

It should be further noted that, the manufacturability of the permanent magnet 12 can be improved by means of the sub-arc segment 123a with a reduced curvature, the proportion of saved material will vary accordingly. With increase of the total length of the sub-straight segment 123b and the sub-arc segment 123a, more material will be saved and cost will be reduced more accordingly, while the strength and the manufacturability of the permanent magnet 12 becomes poor. Therefore, only the curvature of the sub-arc segment 123a and the total length of the sub-straight segment 123b and the sub-arc segment 123a are made within an optimal range, the permanent magnet 12 with the optimal cost performance can be designed.

In some embodiment of the present disclosure, referring to FIG. 1 to FIG. 12, the head endpoint A and/or the tail endpoint B are directly connected to the sub-arc segment 123a or the sub-straight segment 123b. That is the head endpoint A is directly connected to the sub-arc segment 123a or the sub-straight segment 123b, and/or the tail endpoint B is directly connected to the sub-arc segment 123a or the sub-straight segment 123b. Therefore, the structure of the permanent magnet 12 can be simplified, which facilitates machining and molding the permanent magnet 12.

Further, referring to FIG. 9 to FIG. 12, when the head endpoint A is directly connected to the sub-arc segment 123a, an included angle $\alpha 1$ between the sub-arc segment 123a which is directly connected to the head endpoint A and the first edge 121 satisfies $\alpha 1 \geq 90°$; and/or when the tail endpoint B is directly connected to the sub-arc segment 123a, an included angle $\alpha 2$ between the sub-arc segment 123a which is directly connected to the tail endpoint B and the second edge 122 satisfies $\alpha 2 \geq 90°$; and/or when the head endpoint A is directly connected to the sub-straight segment 123b, an included angle $\beta 1$ between the sub-straight segment 123b which is directly connected to the head endpoint A and the first edge 121 satisfies $\beta 1 \geq 90°$; and/or when the tail endpoint B is directly connected to the sub-straight segment 123b, an included angle $\beta 2$ between the sub-straight segment 123b which is directly connected to the tail endpoint B and the second edge 122 satisfies $\beta 2 \geq 90°$. Therefore, the manufacture qualification rate of the permanent magnet 12 can be ensured, and the manufacturing cost can be reduced.

It should be noted herein that, α1 denotes the angle between a tangent of the sub-arc segment 123a which is directly connected to the head endpoint A at the head endpoint A and the first edge 121, and α2 denotes the angle between a tangent of the sub-arc segment 123a which is directly connected to the tail endpoint B at the tail point and the second edge 122.

In some embodiments of the present disclosure, as shown in FIG. 1, the transition edge 123 is directly connected to the head endpoint A and the tail endpoint B by means of the sub-arc segment 123a or the sub-straight segment 123b respectively. An included angle α between the transition edge 123 and the first edge 121 and an included angle β between the transition edge 123 and the second edge 122 satisfy α+β≤270°. Therefore, the permanent magnet motor 10 can have high cost performance.

It should be noted herein that, when the transition edge 123 which is connected to the head endpoint A is the sub-straight segment 123b, the included angle α means an angle between the sub-straight segment 123b and the first edge 121. When the transition edge 123 which is connected to the head endpoint A is the sub-arc segment 123a, the included angle α means an angle between a tangent of the sub-arc segment 123a at the head endpoint A and the first edge 121. When the transition edge 123 which is connected to the tail endpoint B is the sub-straight segment 123b, the included angle β means an angle between the sub-straight segment 123b and the second edge 122. When the transition edge 123 which is connected to the tail endpoint B is the sub-arc segment 123a, the included angle β means an angle between a tangent of the sub-arc segment 123a at the tail endpoint B and the first edge 121.

FIG. 13 is a graph showing relationship between a manufacture qualification rate of the permanent magnet 12 according to an embodiment of the present disclosure and a and β. It can be seen from FIG. 13, in case of α<90°, the manufacture qualification rate of the permanent magnet 12 is low, and within the range of β≥90°, the manufacture qualification rate of permanent magnet 12 keeps at a high level. Similarly, in cased of β≤90°, manufacture qualification rate of the permanent magnet 12 is low, and within the range of β≥90°, the manufacture qualification rate of permanent magnet 12 keeps at a high level.

Figure 14:
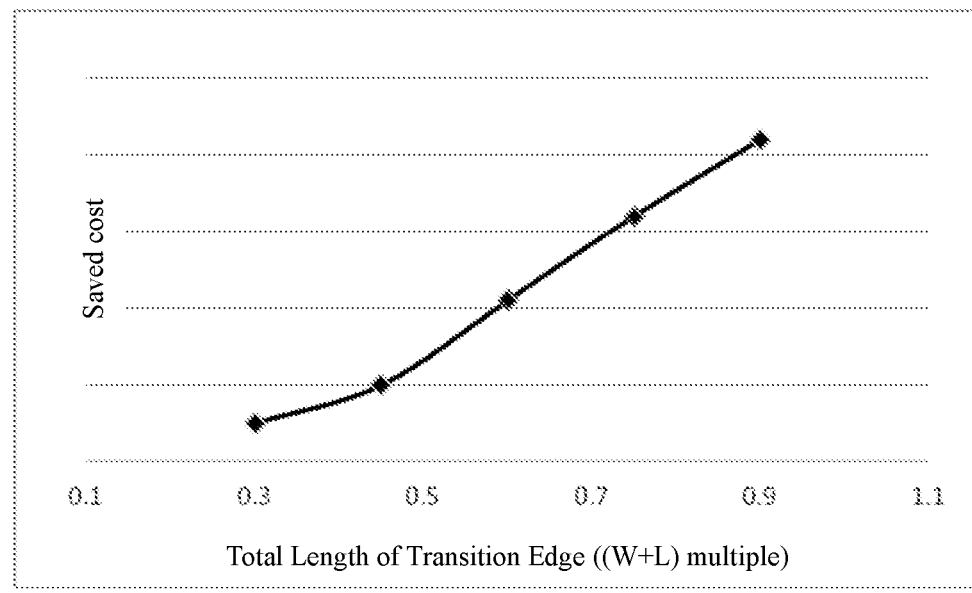
FIG. 14 is a schematic view of cost performance of a permanent magnet according to an embodiment of the present disclosure, in which, the cost performance varies with $\alpha+\beta$.

FIG. 14 is a graph showing relationship between the cost performance of the permanent magnet 12 according to an embodiment of the present disclosure and (α+β). It can be seen from FIG. 14, the cost performance of the permanent magnet 12 substantially tends to decrease with increase of α+β, and in case of α+β≤270°, the cost performance of the permanent magnet 12 substantially is low in downtrend and substantially stable and keeps at a high level, in case of α+β>270°, the cost performance of the permanent magnet 12 quickly decreases, which cannot meet requirement of high performance with low cost.

As for the permanent magnet 12 according to a second aspect of the present disclosure, referring to FIG. 1, a work face of the permanent magnet 12 is a substantially rectangle formed by four edges which are connected from a head to a tail sequentially. It should be noted herein that, the "substantially" rectangle means the work face of the permanent magnet 12 is not a whole rectangle, such as that one corner, two corners, three corners or four corners are cut down from the work face of the permanent magnet 12, which forms the non-whole rectangle.

Referring to FIG. 1, a head endpoint and a tail endpoint of at least one group of adjacent edges are connected by means of the transition edge 123, that is, only one group of adjacent edges are connected by means of the transition edge 123, or two groups of adjacent edges are connected by means of transition edges 123, or three groups of adjacent edges are connected by means of transition edges 123, or all four groups of adjacent edges are connected by means of transition edges 123.

The transition edge 123 is located at a side, adjacent to a center of the work face, of a line connecting the head endpoint with the tail endpoint, and includes at least one sub-arc segment 123a or a combination of at least one sub-arc segment 123a and at least one sub-straight segment 123b, that is, the transition edge 123 may only include the sub-arc segment 123a, or the transition edge 123 may be the combination of the sub-arc segment 123a and the sub-straight segment 123b. Included angles (such as α and β shown in FIG. 1) between the transition edge 123 and a group of adjacent edges (such as the first edge 121 and the second edge 122 shown in FIG. 1) which are connected to the transition edge 123 are each larger than or equal to 90°, a sum (such as α+β shown in FIG. 1) of the included angles between the transition edge 123 and a group of adjacent edges which are connected to the transition edge 123 is less than or equal to 270°, and the permanent magnet 12 satisfies $$WL/\sqrt{W^2+L^2} \le Dx \le 0.9\sqrt{W^2+L^2},$$

In which, extension lines of a group of adjacent edges intersect at the point C near the transition edge 123, W denotes a distance between the point C and a head endpoint A, L denotes a distance between the point C and a tail endpoint B, Dx denotes a distance between the point C and a midpoint of any sub-arc segment 123a.

The permanent magnet 12 according to the present disclosure raises the coefficient of flux utilization, ensures the performance of a motor 10, and meanwhile, has high manufacture qualification rate is high, good manufacturability and mechanical strength.

With reference to FIG. 1 to FIG. 18, the permanent magnets 12 according to multiple embodiments are described.

The First Embodiment

Figure 2:
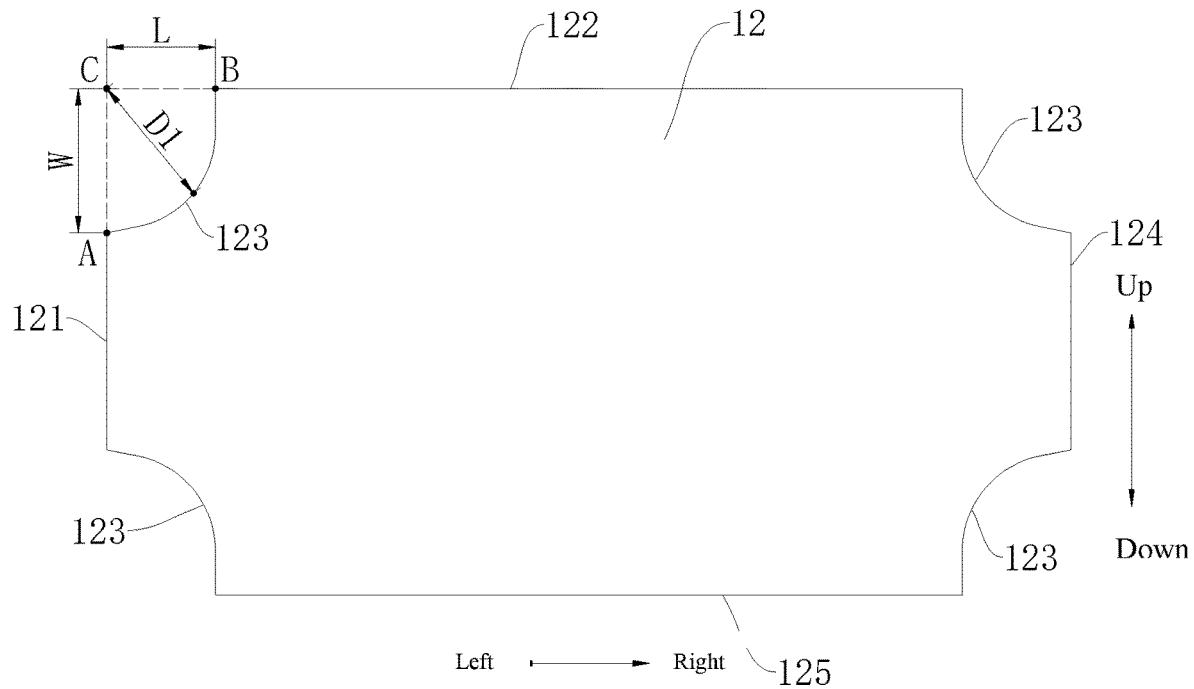
FIG. 2 is a schematic view of a permanent magnet according to a first embodiment of the present disclosure.
Figure 3:
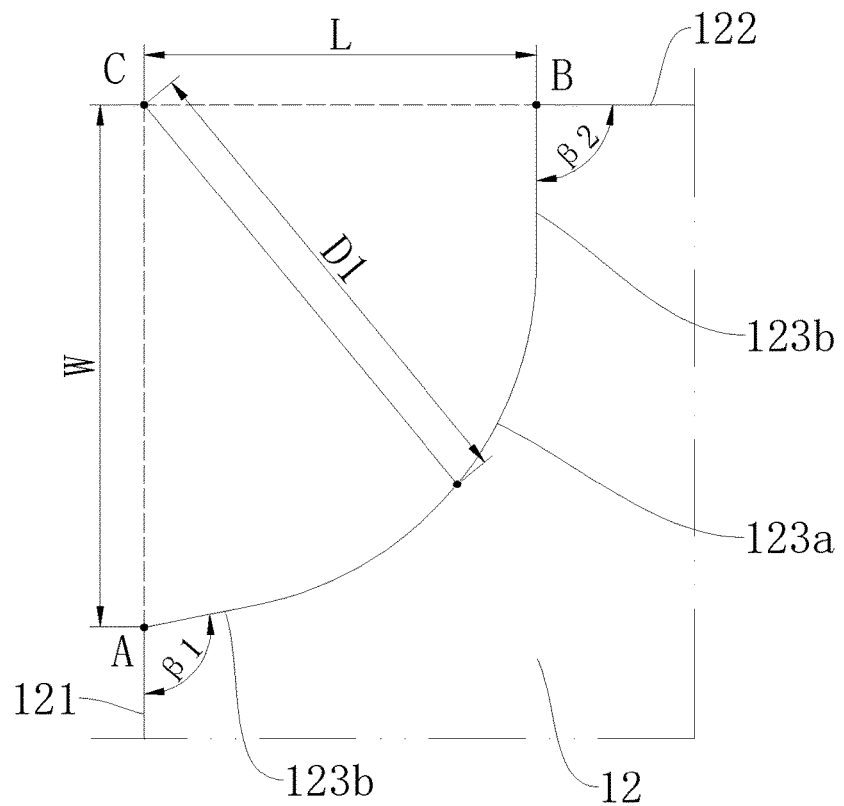
FIG. 3 is an enlarged view of a transition edge of the permanent magnet shown in FIG. 2.

As shown in FIG. 2 and FIG. 3, a work face of the permanent magnet 12 is a substantially rectangle formed by a first edge 121, a second edge 122, a third edge 124 and a fourth edge 125 which are connected from a head to a tail sequentially. A head endpoint and a tail endpoint of any group of adjacent edges are connected by means of a transition edge 123. The work face of the permanent magnet 12 is symmetrical about a central line in a length direction (such as a left-right direction shown in FIG. 2) of the permanent magnet 12, and the work face of the permanent magnet 12 is symmetrical about a central line in a width direction (such as an up-down direction shown in FIG. 2) of the permanent magnet 12. The transition edge 123 connecting a head endpoint A of the first edge 121 with a tail endpoint B of the second edge 122 is described below.

Specifically, as shown in FIG. 3, the transition edge 123 is located at a right or lower side of a line connecting the head endpoint A with the tail endpoint B, that is, the transition edge 123 sinks towards a center of the permanent magnet 12. The transition edge 123 includes one sub-arc segment 123a and two sub-straight segments 123b. The two sub-straight segments 123b are connected to the head endpoint A and the tail endpoint B respectively, and the sub-arc segment 123a is arranged between the two sub-straight segments 123b.

An extension line, upwards extending from the head endpoint A, of the first edge 121 intersects with an extension line, leftwards extending from the tail endpoint B, of the second edge 122 at the point C of intersection. A distance between the head endpoint A and the point C of intersection is denotes as W, a distance between the tail endpoint B and the point C of intersection is denotes as L, and a distance between a midpoint of the sub-arc segment 123*a* and the point C of intersection is denotes as D1, a total length of the transition edge 123 is denotes as S, a curvature of the sub-arc segment 123*a* is denotes as ρ, an included angle between the sub-straight segment 123*b* connected to the head endpoint A and the first edge 121 is denoted as β1, an included angle between the sub-straight segment 123*b* connected to the tail endpoint B and the second edge 122 is denoted as β2.

Preferably, the distance D1 between the midpoint of the sub-arc segment 123*a* and the point C of intersection satisfies $WL/\sqrt{W^2+L^2} \leq D1 \leq 0.8\sqrt{W^2+L^2}$.

FIG. 14 is a graph showing relationship between the total length of the transition edge 123 and the material cost of the permanent magnet 12 according to the embodiment of the present disclosure, in a condition that L and W are kept constant, and meanwhile D1 satisfies $WL/\sqrt{W^2+L^2} \leq D1 \leq 0.9\sqrt{W^2+L^2}$. It can be seen from FIG. 14, the saved material increases with the total length of the sub-straight segments 123*b* and sub-arc segment 123*a*, decrease degree of the cost also increase accordingly. However, the mechanical strength and manufacturability of the permanent magnet 12 becomes poor with the total length of the sub-straight segments 123*b* and sub-arc segment 123*a*. Therefore, preferably, the total length of the transition edge 123 S satisfies S<0.95(W+L).

FIG. 13 shows influence on the manufacture rejection rate of the permanent magnet 12 according to the embodiment of the present disclosure caused by the changes of the curvature of the sub-arc segment 123*a*, in a condition that L and W are kept constant. It can be seen from FIG. 13, the curvature of the sub-arc segment 123*a* exerts a powerful influence over manufacturability of the permanent magnet 12, the manufacture rejection rate of the permanent magnet 12 obviously rises with increase of the curvature of the sub-arc segment 123*a* within a certain range. Therefore, preferably, the curvature p of the sub-arc segment 123*a* satisfies ρ<0.7 mm$^{-1}$.

Preferably, an included angle β1 between the sub-straight segment 123*b* connected to the head endpoint A and the first edge 121 and an included angle β2 between the sub-straight segment 123*b* connected to the tail endpoint B and the second edge 122 satisfies β1≥90°, β2≥90° and β1+β2≤270°. Therefore, the manufacture qualification rate of the permanent magnet 12 can be increased and the cost performance of the motor 10 can be improved.

The permanent magnet 12 according to the embodiment of the present disclosure is good in manufacturability and mechanical strength with low manufacture rejection rate, and the material cost can be saved, and the cost performance of the motor 10 is high.

The Second Embodiment

Figure 4:
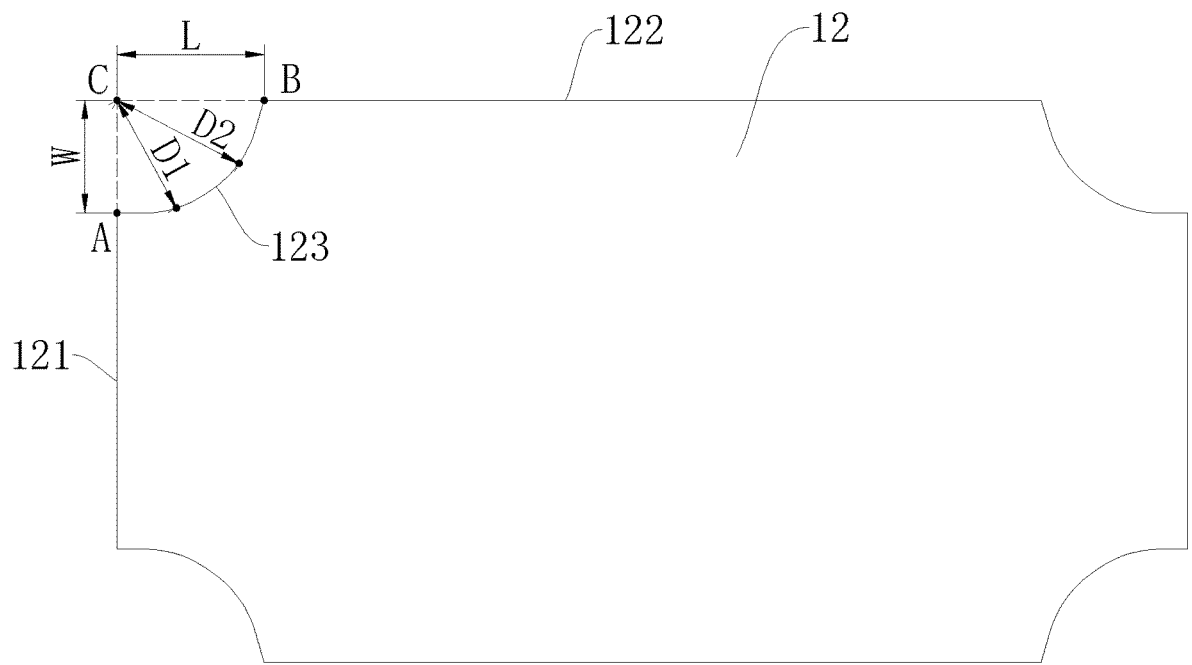
FIG. 4 is a schematic view of a permanent magnet according to a second embodiment of the present disclosure.
Figure 5:
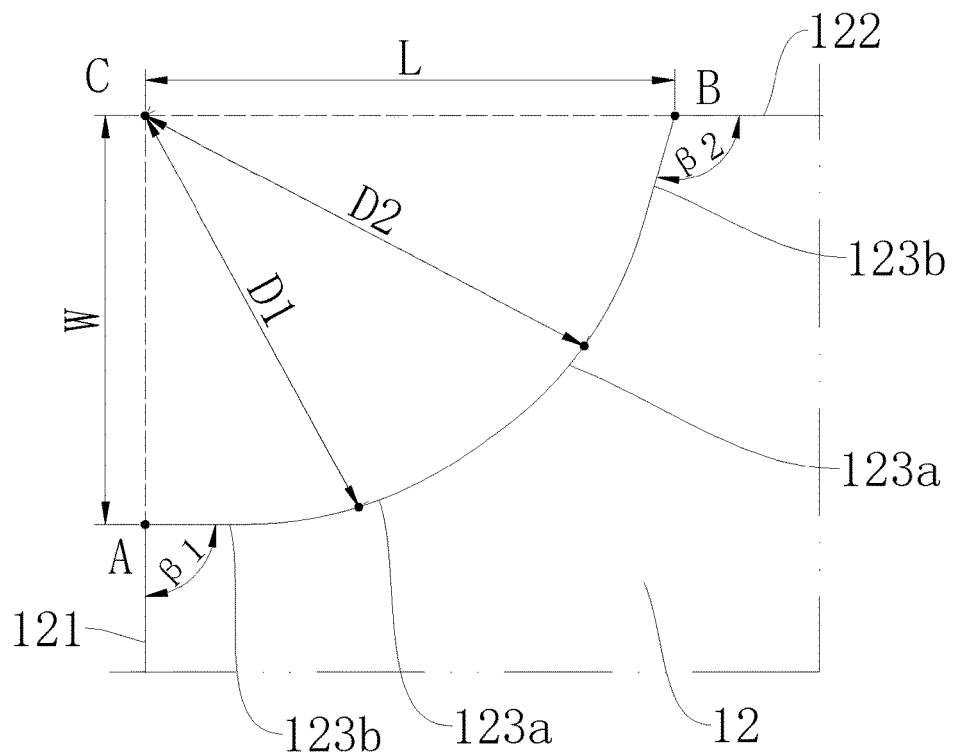
FIG. 5 is an enlarged view of a transition edge of the permanent magnet shown in FIG. 4.

As shown in FIG. 4 and FIG. 5, a structure in the embodiment is generally the same as that in the first embodiment, the difference is that the transition edge 123 in the first embodiment includes only one sub-arc segment 123*a*, while the transition edge 123 in the second embodiment includes two sub-arc segments 123*a*.

In the embodiment, a distance between a midpoint of one of the sub-arc segments 123*a* of the transition edge 123 and the point C of intersection is denoted as D1, and a distance between a midpoint of the other one of the sub-arc segments 123*a* of the transition edge 123 and the point C of intersection is denoted as D2, and D1 and D2 satisfy $$WL/\sqrt{W^2+L^2} \leq D1 \leq 0.8\sqrt{W^2+L^2}, \text{ and}$$

$$WL/\sqrt{W^2+L^2} \leq D2 \leq 0.8\sqrt{W^2+L^2}.$$

The permanent magnet 12 according to the embodiment of the present disclosure is good in manufacturability and mechanical strength with low manufacture rejection rate, and the material cost can be saved, and the cost performance of the motor 10 is high.

The Third Embodiment

Figure 6:
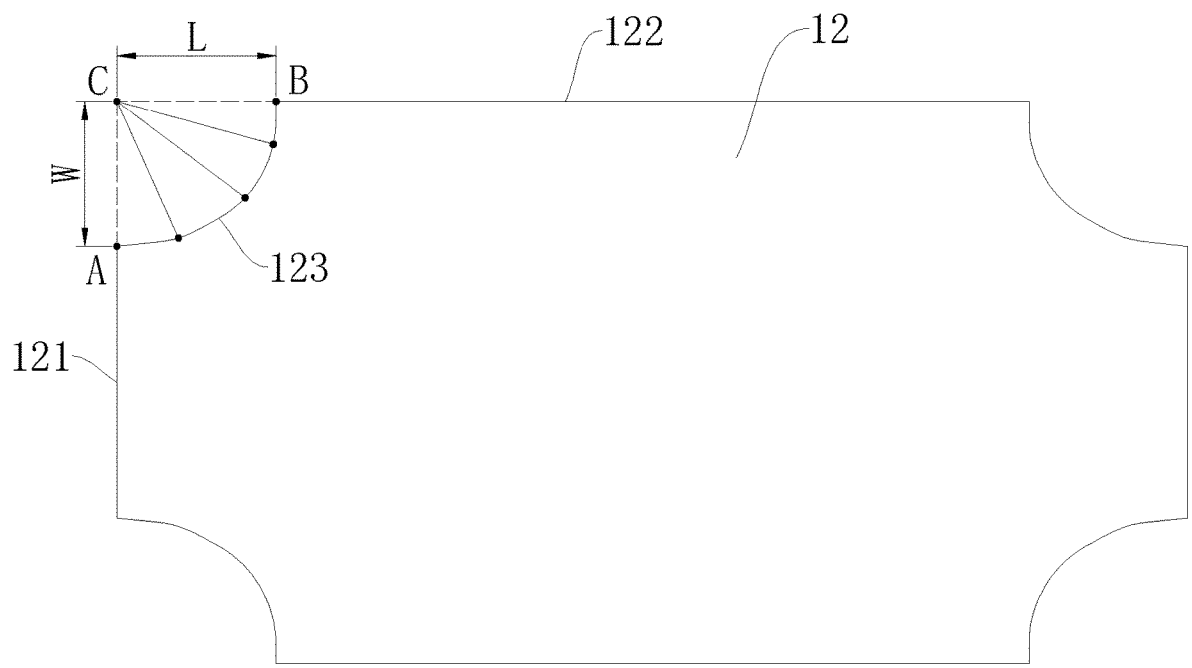
FIG. 6 is a schematic view of a permanent magnet according to a third embodiment of the present disclosure.
Figure 7:
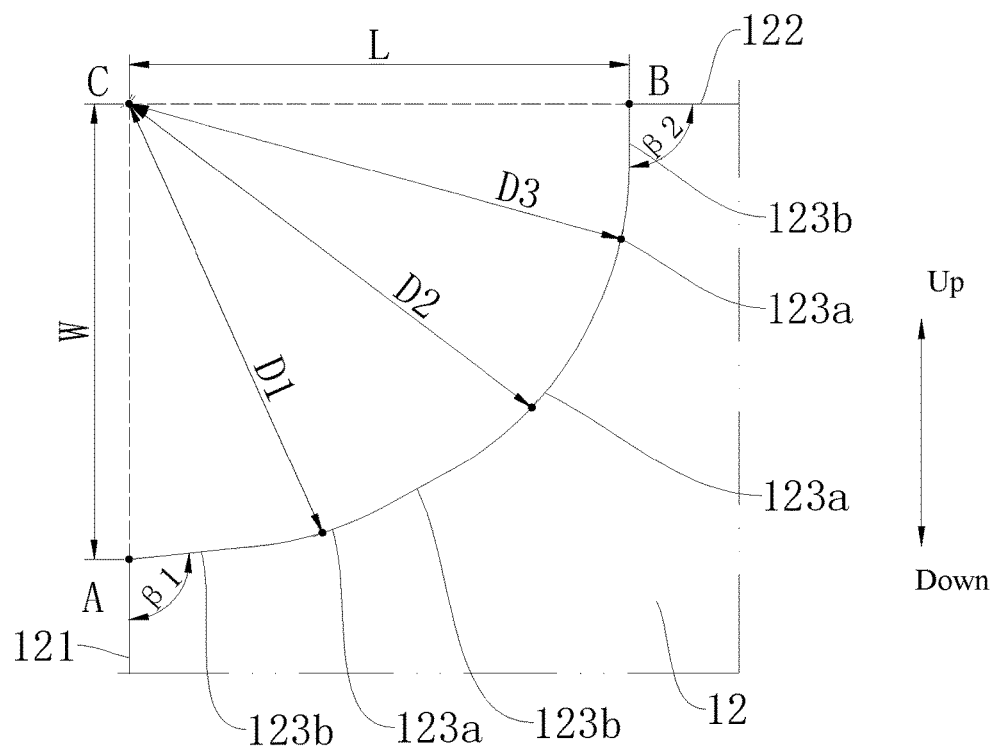
FIG. 7 is an enlarged view of a transition edge of the permanent magnet shown in FIG. 6.

As shown in FIG. 6 and FIG. 7, a structure in the embodiment is generally the same as that in the first embodiment, the elements having same functions are denoted by same reference numerals, the difference is that the transition edge 123 in the first embodiment includes only one sub-arc segment 123*a*, while the transition edge 123 in this embodiment includes three sub-arc segments 123*a*.

In the embodiment, the transition edge 123 includes a first sub-arc segments 123*a*, a second sub-arc segments 123*a* and a third sub-arc segments 123*a* which extend from the lower to the upper, a distance between a midpoint of the first sub-arc segments 123*a* and the point C of intersection is denotes as D1, a distance between a midpoint of the second sub-arc segments 123*a* and the point C of intersection is denotes as D2, and a distance between a midpoint of the third sub-arc segments 123*a* and the point C of intersection is denotes as D3, and D1, D2 and D3 satisfy $$WL/\sqrt{W^2+L^2} \leq D1 \leq 0.8\sqrt{W^2+L^2},$$

$$WL/\sqrt{W^2+L^2} \leq D2 \leq 0.8\sqrt{W^2+L^2}, \text{ and}$$

$$WL/\sqrt{W^2+L^2} \leq D3 \leq 0.8\sqrt{W^2+L^2}.$$

The permanent magnet 12 according to the embodiment of the present disclosure is good in manufacturability and mechanical strength with low manufacture rejection rate, and the material cost can be saved, and the cost performance of the motor 10 is high.

The Fourth Embodiment

Figure 8:
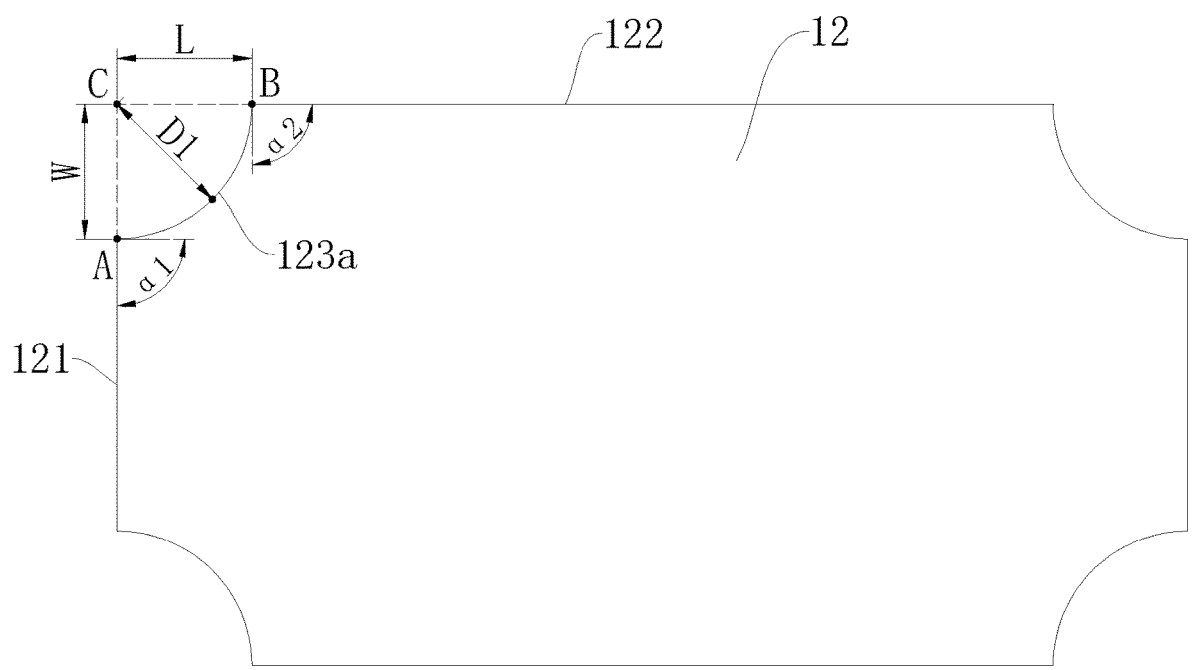
FIG. 8 is a schematic view of a permanent magnet according to a fourth embodiment of the present disclosure.

As shown in FIG. 8, a structure in the embodiment is generally the same as that in the first embodiment, the elements having same functions are denoted by same reference numerals, the difference is that the transition edge 123 in the first embodiment includes one sub-arc segment 123*a* and two sub-straight segments 123*b*, while the transition edge 123 in this embodiment includes only one sub-arc segments 123*a*. That is, the transition edge 123 is consist of only one sub-arc segment 123*a*, and two ends of the sub-arc segment 123*a* are directly connected to the head endpoint A and the tail endpoint B respectively.

As shown in FIG. 8, an included angle between a tangent of the sub-arc segment 123*a* at the head endpoint A and the first edge 121 is denoted as α1, an included angle between a tangent of the sub-arc segment 123*a* at the tail endpoint B and the second edge 122 is denoted as α2, α1 and α2 satisfy α1≥90°, α2≥90° and α1+α2≤270°.

Preferably, a distance D1 between a midpoint of the sub-arc segment 123a and a point C of intersection satisfies $$WL/\sqrt{W^2+L^2} \leq D1 \leq 0.9\sqrt{W^2+L^2}.$$

The permanent magnet 12 according to the embodiment of the present disclosure is good in manufacturability and mechanical strength with low manufacture rejection rate, and the material cost can be saved, and the cost performance of the motor 10 is high.

The Fifth Embodiment

Figure 9:
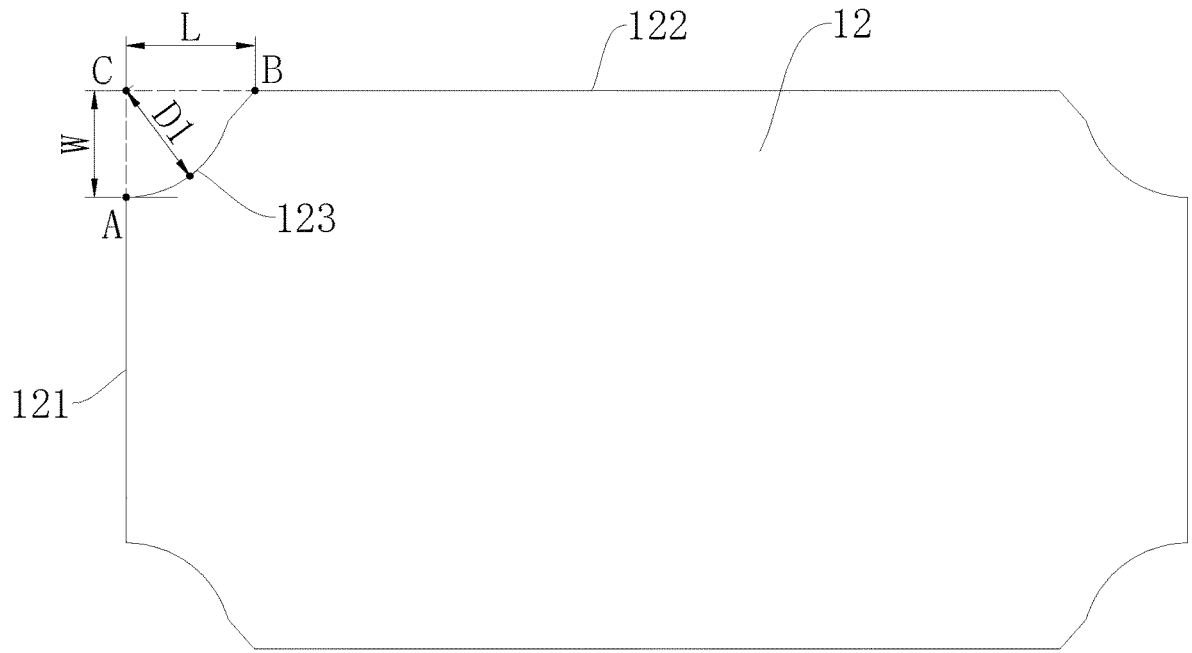
FIG. 9 is a schematic view of a permanent magnet according to a fifth embodiment of the present disclosure.
Figure 10:
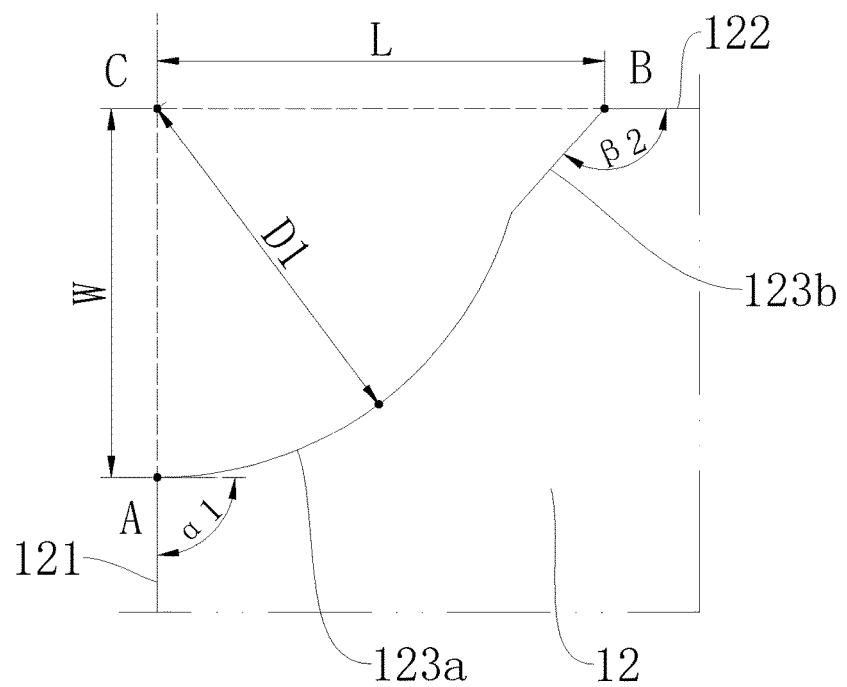
FIG. 10 is an enlarged view of a transition edge of the permanent magnet shown in FIG. 9.

As shown in FIG. 9 and FIG. 10, a structure in the embodiment is generally the same as that in the first embodiment, the elements having same functions are denoted by same reference numerals, the difference is that the transition edge 123 in the first embodiment includes one sub-arc segment 123a and two sub-straight segments 123b, while the transition edge 123 in this embodiment includes only one sub-arc segments 123a and one sub-straight segment 123b. Specifically, the transition edge 123 is directly connected to the head endpoint A, and the sub-straight segment 123b is directly connected to the tail endpoint B.

As shown in FIG. 10, an included angle between a tangent of an arc segment of a stator at the head endpoint A and the first edge 121 is denoted as α1, an included angle between the sub-straight segment 123b and the second edge 122 is denoted as β2, α1 and β2 satisfy α1≥90°, β2≥90°, α1+β2≤270°.

Preferably, a distance D1 between a midpoint of the sub-arc segment 123a and a point C of intersection satisfies $$WL/\sqrt{W^2+L^2} \leq D1 \leq 0.8\sqrt{W^2+L^2}.$$

The permanent magnet 12 according to the embodiment of the present disclosure is good in manufacturability and mechanical strength with low manufacture rejection rate, and the material cost can be saved, and the cost performance of the motor 10 is high.

The Sixth Embodiment

Figure 11:
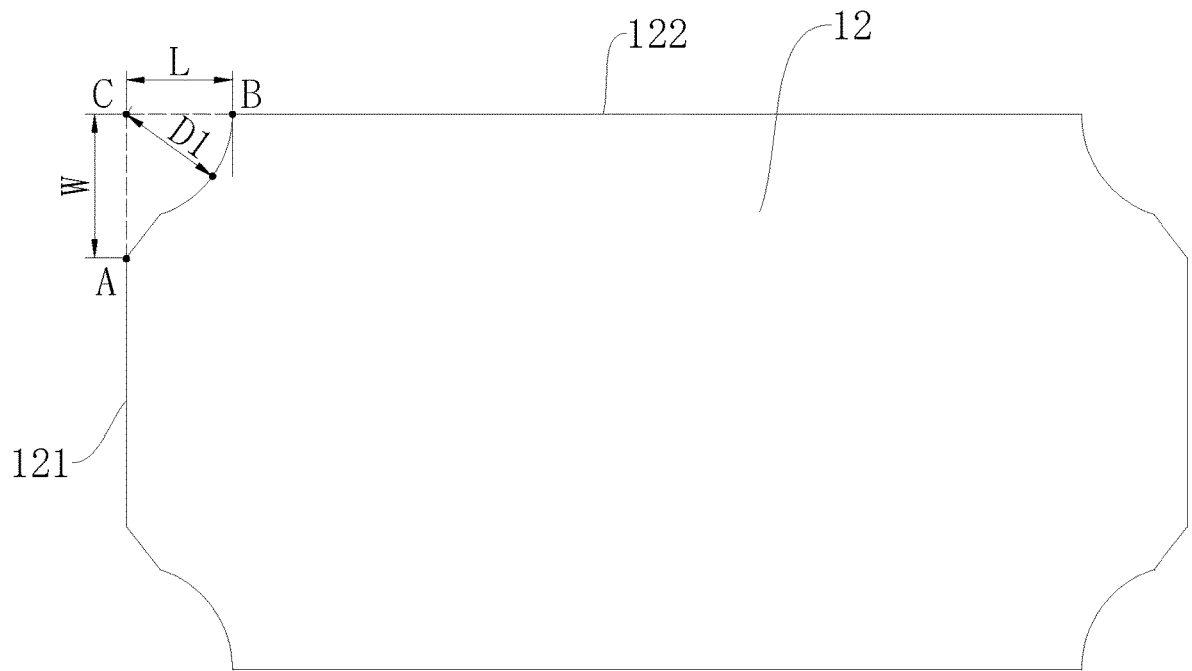
FIG. 11 is a schematic view of a permanent magnet according to a sixth embodiment of the present disclosure.
Figure 12:
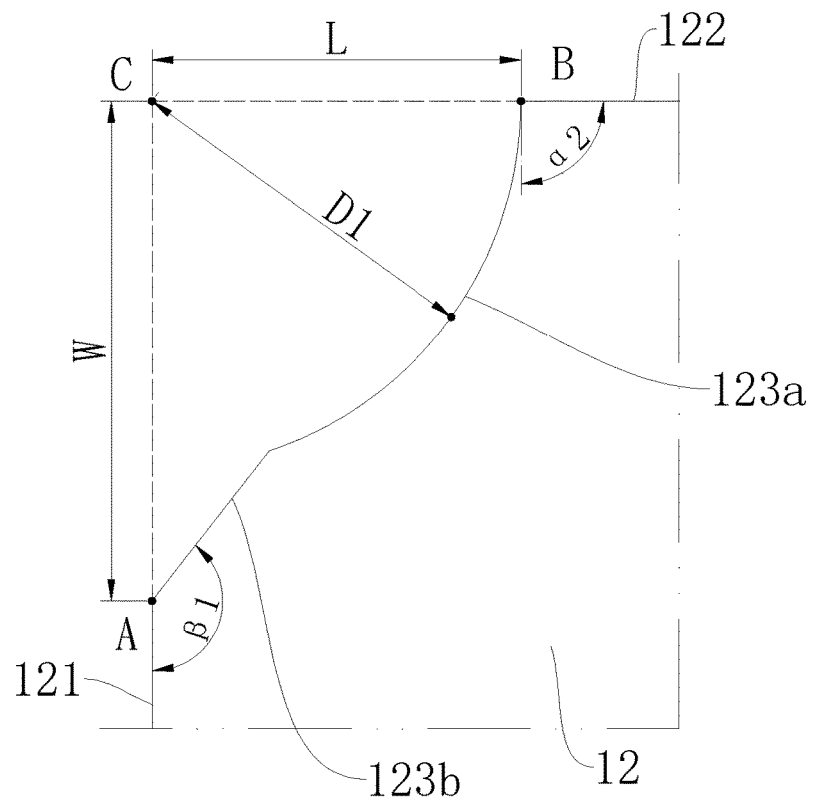
FIG. 12 is an enlarged view of a transition edge of the permanent magnet shown in FIG. 11.

As shown in FIG. 11 and FIG. 12, a structure in the embodiment is generally the same as that in the fifth embodiment, the elements having same functions are denoted by same reference numerals, the difference is that in the fifth embodiment the sub-arc segment 123a is directly the first edge 121, and the sub-straight segment 123b is connected to the second edge 122, while in this embodiment, the sub-arc segments 123a is directly connected to the second edge 122, and the sub-straight segment 123b is connected to the first edge 121.

An included angle between a straight segment of a stator and the first edge 121 is denoted as β1, an included angle between a tangent of the sub-arc segment 123a at the tail endpoint B and the second edge 122 is denoted as α2, β1 and α2 satisfy α1≥90°, β2≥90°, and α1+β2≤270°.

Preferably, a distance D1 between a midpoint of the sub-arc segment 123a and a point C of intersection satisfies $$WL/\sqrt{W^2+L^2} \leq D1 \leq 0.8\sqrt{W^2+L^2}$$

The permanent magnet 12 according to the embodiment of the present disclosure is good in manufacturability and mechanical strength with low manufacture rejection rate, and the material cost can be saved, and the cost performance of the motor 10 is high.

A rotor 1 according to a third aspect of the present disclosure includes the permanent magnet 12 according to the above embodiments of the present disclosure.

The rotor 1 according to an embodiment of the present disclosure is provided with the permanent magnet 12 of the embodiments of the first aspect, thereby improving whole performance of the rotor 1.

A motor 10 according to a fourth aspect of the present disclosure includes the rotor 1 according to the embodiment of the third aspect.

Figure 15:
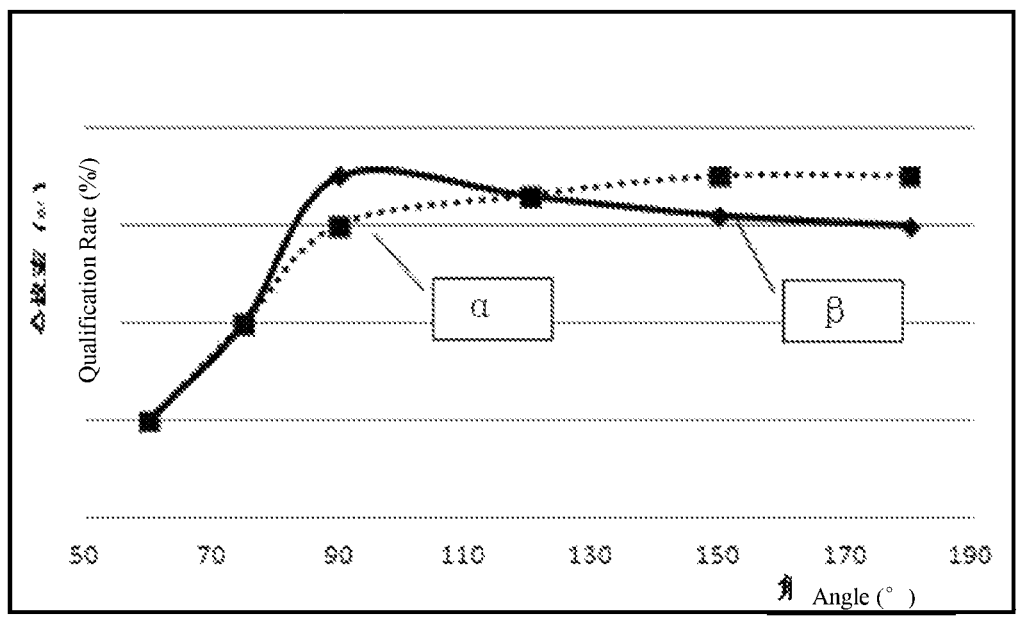
FIG. 15 is a schematic view of a manufacture rejection rate of a permanent magnet according to the first embodiment of the present disclosure, in which, the rejection rate varies with curvature of a sub-arc segment.
Figure 16:
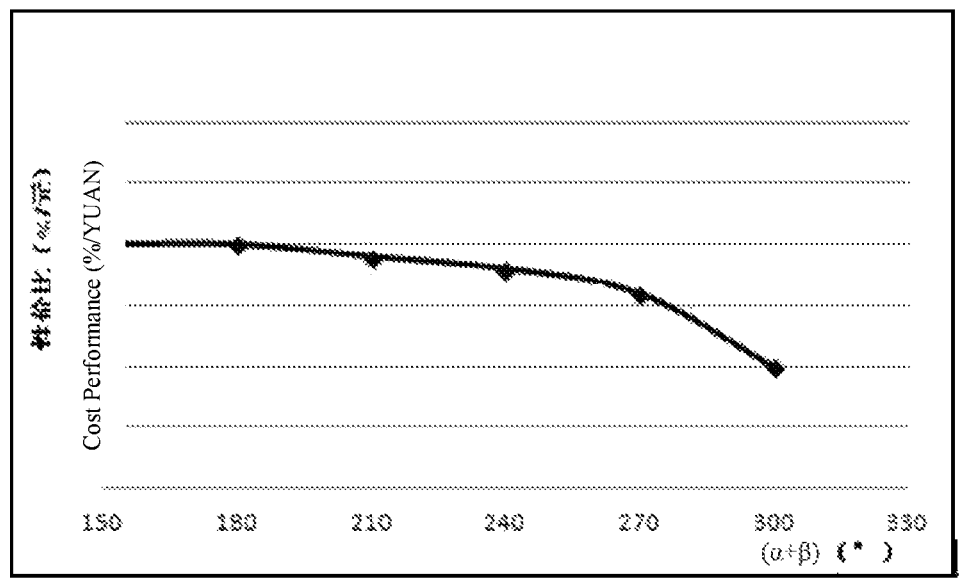
FIG. 16 is a schematic view of a saved cost of a permanent magnet according to the first embodiment of the present disclosure, in which, the saved cost varies with a total length of a sub-arc segment of a transition edge.
Figure 17:
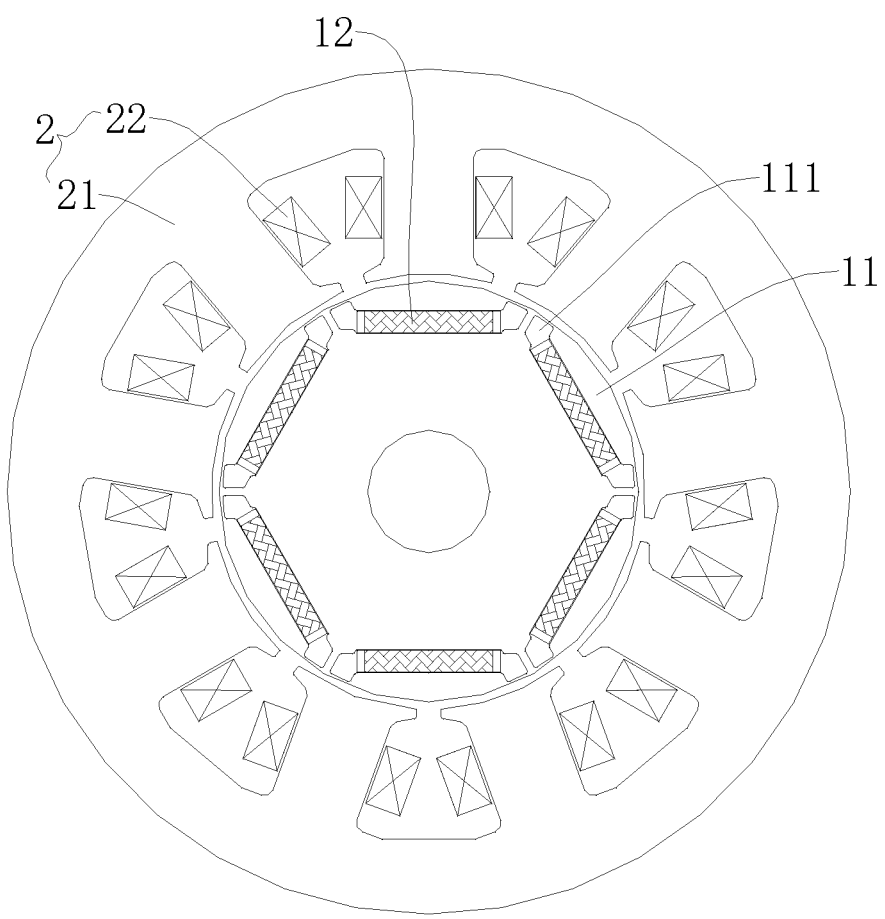
FIG. 17 is a schematic view of a motor according to an embodiment of the present disclosure.
Figure 18:
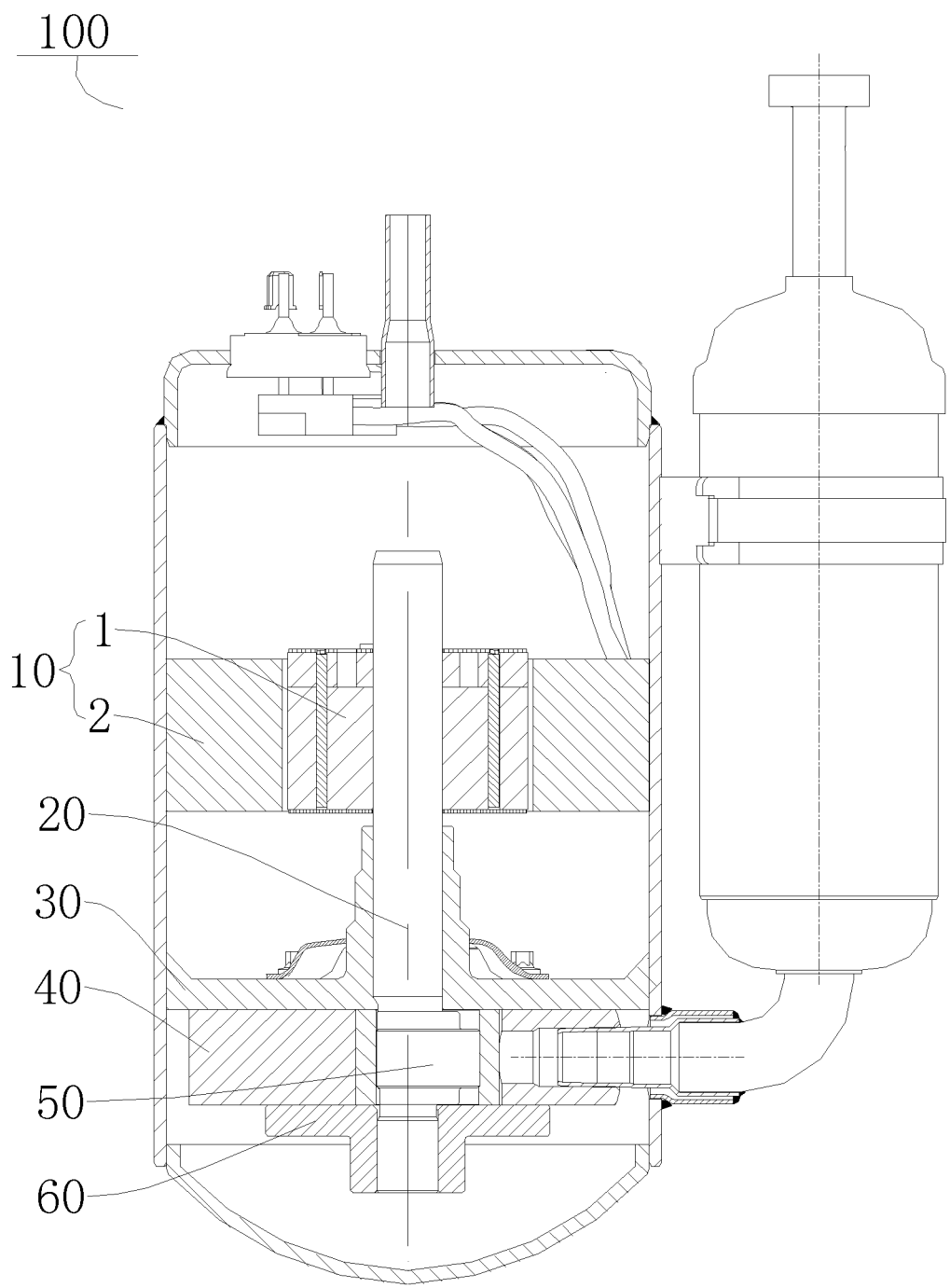
FIG. 18 is a schematic view of a compressor according to an embodiment of the present disclosure.

Specifically, as shown in FIG. 15, the motor 10 includes the rotor 1 and a stator 2, in which, the stator 2 is arranged at an outside of the rotor 1 in a radial direction. The stator 2 includes a stator core 21 and a winding 22, and the rotor 1 includes a rotor core 11, a permanent magnet groove 111 and the permanent magnet 12 arranged in the permanent magnet groove 111.

A specific structure and operating principle of the motor 10 according to embodiments of the present disclosure are existing technologies and will not be described in detail herein.

A motor 10 according to embodiments of the present disclosure is provided with the rotor 1 according to the third aspect, such that the permanent magnet motor 10 has high performance with low cost, which means high cost performance, and the permanent magnet motor 10 also has good manufacturability.

A compressor according to an embodiment of a fifth aspect of the present disclosure includes the permanent magnet motor 10 of the embodiment of the fourth aspect.

Structures and operating principles of other components, such as a crank 20, a main bearing 30, a cylinder 30, a piston 50 and a supplementary bearing 60 of the compressor according to the embodiment of the present disclosure are known by those skilled in the art and will not be described in detail herein.

The compressor 100 according to the embodiment of the present disclosure is provided with the permanent motor 10 of the embodiment of the fourth aspect, thereby reducing a manufacturing cost of the compressor 100 and improving the performance of the compressor 100, which makes the compressor 100 has a high cost performance in whole.

In the specification, unless specified or limited otherwise, relative terms such as "central", "longitudinal", "width", "upper", "lower", "left", "right", "vertical", "horizontal", "top", "bottom", "inner", "outer", "clockwise", "anticlockwise" "axial", "radial" and "circumferential" should be construed to refer to the orientation as then described or as shown in the drawings under discussion. These relative terms are for convenience of description and do not require that the present disclosure be constructed or operated in a particular orientation. Therefore, the above terms should not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "illustrative embodiment", "a specific example," or "some examples," means that a particular feature, structure, material, or characteristic described in connection with the embodiment or example is included in at least one embodiment or example of the present disclosure. Thus, the appearances of the phrases are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A permanent magnet comprising:
a work face provided on a plane, comprising:
 a first edge having a head endpoint;
 a second edge having a tail endpoint, wherein the first edge and the second edge are perpendicular to each other; and
 a transition edge connecting the head endpoint of the first edge to the tail endpoint of the second edge, wherein an imaginary straight line connecting the head endpoint of the first edge to the tail endpoint of the second edge divides the plane into a first section encompassing the first edge and the second edge and a second section, wherein the transition edge is located in the first section, wherein the transition edge comprises at least one sub-arc segment,
wherein an extension line extending from the head endpoint of the first edge intersects an extension line extending from the tail endpoint of the second edge at a point of intersection, and the permanent magnet satisfies $WL/\sqrt{W^2+L^2} \leq Dx \leq 0.9\sqrt{W^2+L^2}$, wherein:
 W denotes a distance between the point of intersection and the head endpoint,
 L denotes a distance between the point of intersection and the tail endpoint, and
 Dx denotes a distance between the point of intersection and a midpoint of the at least one sub-arc segment.

2. The permanent magnet according to claim 1, wherein the permanent magnet satisfies $WL/\sqrt{W^2+L^2} \leq Dx \leq 0.8\sqrt{W^2+L^2}$.

3. The permanent magnet according to claim 1, wherein a length S of the transition edge satisfies $S<0.95(W+L)$.

4. The permanent magnet according to claim 1, wherein a curvature $\rho$ of the at least one sub-arc segment satisfies $\rho<0.7$ mm$^{-1}$.

5. The permanent magnet according claim 1, wherein:
the transition edge further comprises at least one sub-straight segment; and
the head endpoint and/or the tail endpoint are directly connected to the at least one sub-arc segment or the at least one sub-straight segment.

6. The permanent magnet according to claim 5, wherein:
when the head endpoint is directly connected to the at least one sub-arc segment, an included angle $\alpha 1$ between the at least one sub-arc segment which is directly connected to the head endpoint and the first edge satisfies $\alpha 1 \geq 90°$; and/or
when the tail endpoint is directly connected to the at least one sub-arc segment, an included angle $\alpha 2$ between the at least one sub-arc segment which is directly connected with the tail endpoint and the second edge satisfies $\alpha 2 \geq 90°$; and/or
when the head endpoint is directly connected to the at least one sub-straight segment, an included angle $\beta 1$ between the at least one sub-straight segment which is directly connected to the head endpoint and the first edge satisfies $\beta 1 \geq 90°$; and/or
when the tail endpoint is directly connected to the at least one sub-straight segment, an included angle $\beta 2$ between the at least one sub-straight segment which is directly connected to the tail endpoint and the second edge satisfies $\beta 2 \geq 90°$.

7. The permanent magnet according to claim 5, wherein:
the transition edge is directly connected to the head endpoint and the tail endpoint by the at least one sub-arc segment or the at least one sub-straight segment respectively, and
an included angle $\alpha$ between the transition edge and the first edge and an included angle $\beta$ between the transition edge and the second edge satisfy $\alpha+\beta \leq 270°$.

8. A permanent magnet comprising:
a work face that has a substantially rectangular shape formed by four edges which are connected in a head to tail sequence, wherein the substantially rectangular shape has a center,
wherein:
 a first edge of the four edges has a head endpoint and a second edge of the four edges has a tail endpoint;
 the head endpoint and the tail endpoint are connected by a transition edge comprising at least one sub-arc segment; and
 an imaginary straight line connecting the head endpoint and the tail endpoint defines a first side of the imaginary straight line and an opposite second side of the imaginary straight line, wherein both the transition edge and the center of the substantially rectangular shape are in the first side,
wherein:
 a first included angle between the transition edge and the first edge connected to the transition edge is larger than or equal to 90°;

a second included angle between the transition edge and the second edge connected to the transition edge is larger than or equal to 90°; and a sum of the first and second included angles is less than or equal to 270°, and wherein:

the permanent magnet satisfies:

$$WL/\sqrt{W^2+L^2} \leq Dx \leq 0.9\sqrt{W^2+L^2},$$

wherein extension lines of the first and second edges intersect at a point of intersection, W denotes a distance between the point and the head endpoint, L denotes a distance between the point and the tail endpoint, and Dx denotes a distance between the point and a midpoint of the at least one sub-arc segment.

9. A rotor, comprising the permanent magnet according to claim 1.

10. A motor, comprising the rotor according to claim 9.

11. A compressor, comprising the motor according to claim 10.

\* \* \* \* \*